(12) United States Patent
Buchholz, Jr. et al.

(10) Patent No.: US 12,015,850 B1
(45) Date of Patent: Jun. 18, 2024

(54) VEHICLE IMAGE CAPTURE SYSTEMS AND METHODS

(71) Applicant: CarMax Enterprise Services, LLC, Richmond, VA (US)

(72) Inventors: Edward Eric Buchholz, Jr., Midlothian, VA (US); Richard Hunt Benfer, Richmond, VA (US)

(73) Assignee: CARMAX ENTERPRISE SERVICES, LLC, Richmond, VA (US)

( * ) Notice: Subject to any disclaimer, the term of this patent is extended or adjusted under 35 U.S.C. 154(b) by 174 days.

(21) Appl. No.: 17/177,613

(22) Filed: Feb. 17, 2021

(51) Int. Cl.
| | |
|---|---|
| H04N 23/54 | (2023.01) |
| F16M 11/10 | (2006.01) |
| F16M 11/20 | (2006.01) |
| F16M 11/28 | (2006.01) |
| F16M 11/42 | (2006.01) |
| G03B 17/56 | (2021.01) |

(Continued)

(52) U.S. Cl.
CPC ......... *H04N 23/695* (2023.01); *F16M 11/105* (2013.01); *F16M 11/2007* (2013.01); *F16M 11/2092* (2013.01); *F16M 11/28* (2013.01); *F16M 11/42* (2013.01); *G03B 17/561* (2013.01); *G06Q 30/0601* (2013.01); *H04N 23/54* (2023.01); *F16M 2200/027* (2013.01); *F16M 2200/08* (2013.01)

(58) Field of Classification Search
CPC ............. F16M 11/105; F16M 11/2007; F16M 11/2092; F16M 2200/027; F16M 2200/08; F16M 11/28; F16M 11/42; H04N 5/2253; G03B 17/561; G06Q 30/0601

See application file for complete search history.

(56) References Cited

U.S. PATENT DOCUMENTS

| | | | |
|---|---|---|---|
| 6,439,515 B1 * | 8/2002 | Powers | F16M 13/04 248/129 |
| 6,729,592 B1 | 5/2004 | Kurtts | |

(Continued)

FOREIGN PATENT DOCUMENTS

| | | | |
|---|---|---|---|
| CA | 2557186 C | * | 2/2005 |
| CA | 2557186 C | | 9/2008 |

*Primary Examiner* — Dave Czekaj
*Assistant Examiner* — Berteau Joisil
(74) *Attorney, Agent, or Firm* — TROUTMAN PEPPER HAMILTON SANDERS LLP; Christopher J. Forstner; Scott A. Bergeson

(57) ABSTRACT

A system includes a vehicle image capture system having a support structure, a telescoping hollow support beam, a second hollow support beam, a securing device, a support beam mount, a memory device storing instructions, and one or more processors configured to execute instructions to perform the steps of a method to position the vehicle image capture device and capture an image of a vehicle interior. The telescoping hollow support beam may include an outer telescoping component and an inner telescoping component attached by the securing device, and the second hollow support beam may be attached to the telescoping hollow support beam by the support beam mount. The system may further include a battery component, one or more positional sensors, and one or more electromechanical motors to adjust the position of one or more components of the system to capture a centered image of a vehicle interior.

20 Claims, 7 Drawing Sheets

(51) Int. Cl.
   *G06Q 30/0601*    (2023.01)
   *H04N 23/695*     (2023.01)

(56) References Cited

U.S. PATENT DOCUMENTS

| | | |
|---|---|---|
| 9,011,027 B2 | 4/2015 | Wood et al. |
| 11,541,794 B1* | 1/2023 | Muralidharan ........ B60N 2/002 |
| 2008/0116340 A1 | 5/2008 | Greene |
| 2020/0074675 A1* | 3/2020 | Cejka .................. G03B 17/561 |

* cited by examiner

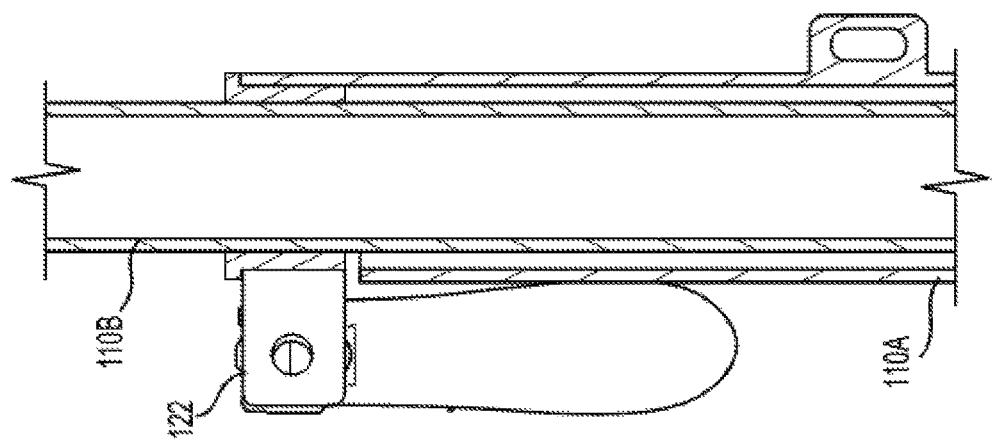
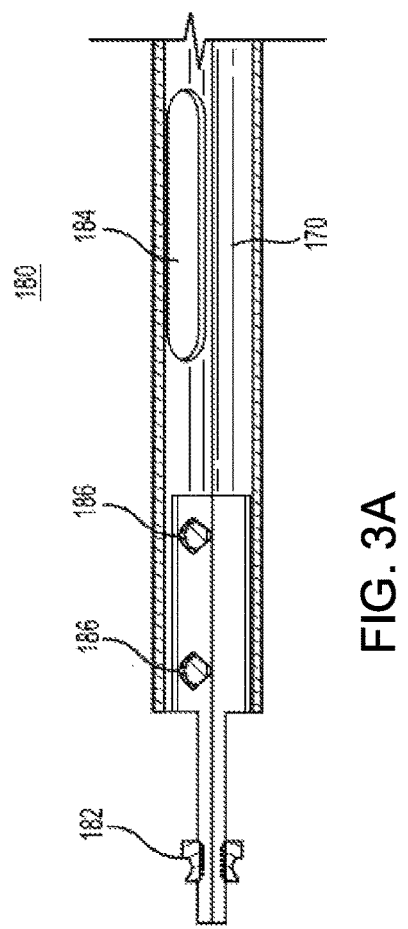
FIG. 3A
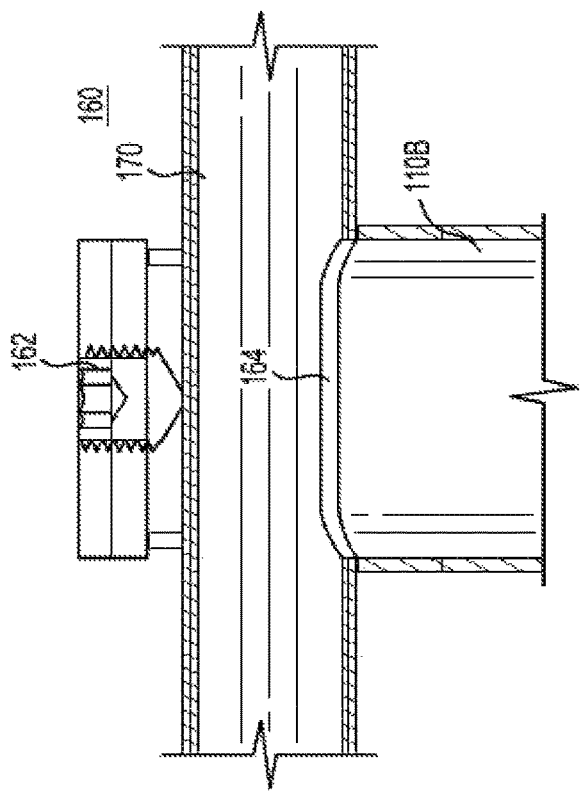
FIG. 3B
FIG. 3C

VEHICLE IMAGE CAPTURE SYSTEMS AND METHODS

FIELD OF THE INVENTION

The present disclosure relates to a support arm image capture system, and more particularly to a vehicle image capture system having an adjustable support structure paired with an image capture device and configured to standardize an image capture process for imaging an interior of a vehicle.

BACKGROUND

Many businesses spend considerable time and money capturing detailed and accurate vehicle images to assist in the sale of said vehicles. However, traditional image capture devices and methods do not provide a convenient way to standardize the imaging process for capturing images of a vehicle's interior.

In online vehicle sales, photos play a critical role in driving sales. Consumers want the ability to see every aspect of a vehicle of interest before making a purchasing decision, or before deciding to visit a physical sales location to further explore the purchase. For interior photos, sellers of vehicles are trying to find solutions to capture photos more quickly, efficiently, and at a lower cost. A key factor in driving down time and cost of imaging a vehicle's interior is to eliminate the need for a human actor to physically enter a vehicle in order to capture interior photos. Additionally, requiring a human to manually adjust an image capture device to image aspects of a vehicle interior leads to image inconsistency.

Accordingly, there is a need for devices and methods for assisting in imaging vehicle interiors without requiring a human to physically enter the vehicle to capture the images. There is also a need for a device that can capture interior vehicle images in a standardized and repeatable fashion and that allows for precise positioning of the imaging device in three-dimensional space in order to create consistent vehicle images across a sellers' inventory.

The present invention is aimed at improving image quality and standardizing the imaging process for imaging vehicle interiors by providing a vehicle image capture system having an adjustable support structure and image capture device configured to image an interior of a vehicle. Embodiments of the present disclosure are directed to this and other considerations.

SUMMARY

Disclosed embodiments provide a vehicle image capture system for imaging an interior of a vehicle. In one aspect, the vehicle image capture system may include an image capture device mounted to a support structure. The support structure may include a hollow support beam to which the image capture device is mounted to a first end of the hollow support beam. The support structure may also include a telescoping hollow support beam to which the hollow support beam is attached. The support structure may also include a base structure attached to the telescoping hollow support beam. The image capture device may be mounted to the hollow support beam with an articulating mount that allows the image capture device to be tilted in a desired orientation. The hollow support beam may be secured to the telescoping hollow support beam that is mounted to the base structure. The hollow support beam may be adjustable to extend or retract in a horizontal dimension. The telescoping hollow support beam may include an inner sleeve and an outer sleeve. The inner sleeve may be configured to slide with respect to the outer sleeve and be secured at a desired vertical position by a securing device that secures the position of the inner sleeve with respect to the outer sleeve. The hollow support beam may be mounted to the top end of the inner sleeve of the telescoping hollow support beam with an articulating head that allows the for adjustment of an angle between the hollow support beam and the telescoping support beam. A bottom end of telescoping hollow support beam may be attached to a top end of the base structure with an articulating mount that allows for the telescoping hollow support beam to be tilted with respect to a vertical axis. The base structure may include a transport subsystem mounted to a bottom end of the base structure. The base structure may also include a battery component. One or more electrical cables may electrically connect at least the battery component with the image capture device. The electrical cables may be housed at least partially inside the base structure, and may be routed through an interior portion of the telescoping hollow support beam and the hollow support beam.

In another aspect, a vehicle image capture system is disclosed. The vehicle image capture system may include a support structure that includes a base structure, a telescoping hollow support beam, and a second hollow support beam. The base structure may include a transport subsystem mounted to a bottom end of the base structure, and a power source. A top end of the base structure may be coupled to a bottom end of the telescoping hollow support beam. A top end of the telescoping hollow support beam may be coupled to the second hollow support beam. An image capture device may be mounted at one end of the second hollow support beam. The image capture device may be coupled with the power source with one or more electrical connectors that are positioned at least partially inside of the telescoping hollow support beam and the second hollow support beam. The telescoping hollow support beam may include an inner sleeve and an outer sleeve. The inner sleeve may be configured to slide with respect to the outer sleeve and may be secured by a securing device in a fixed position with respect to the outer sleeve at a desired position. Additionally, the support structure may be equipped with one or more positional sensors configured to determine a horizontal position and vertical position of the image capture device in relation to a vehicle to be imaged. The one or more positional sensors may be coupled to the power source by one or more electrical cables.

In some embodiments, the vehicle image capture system may be paired with a memory storing instructions, and a processor configured to execute the stored instructions to capture an image of a vehicle interior to be imaged. The vehicle image capture system may include one or more positional sensors and one or more electromechanical motors to adjust the position of the vehicle image capture system with respect to the vehicle to be imaged.

In some embodiments, the vehicle image capture system may include the memory, processor, and one or more positional sensors, but the position may be manually adjusted without the presence of one or more electromechanical motor elements.

In some embodiments, the base structure may be mounted to a rail system integrated into a vehicle photo booth. The rail system may include positional sensors to determine the position of the vehicle image capture system with respect to a vehicle to be imaged. The vehicle image capture system may be configured to be manually slide along the rail system to a desired position, and in some embodiments, may be coupled to one or more electromechanical motors configured to position the vehicle image capture system to a desired location with respect to the vehicle to be imaged.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings that illustrate various implementations and aspects of the disclosed technology and, together with the description, serve to explain the principles of the disclosed technology. In the drawings:

FIGS. 3A-3C show embodiments of exemplary components of an image capture device system according to exemplary implementations of the disclosed technology;

DETAILED DESCRIPTION

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
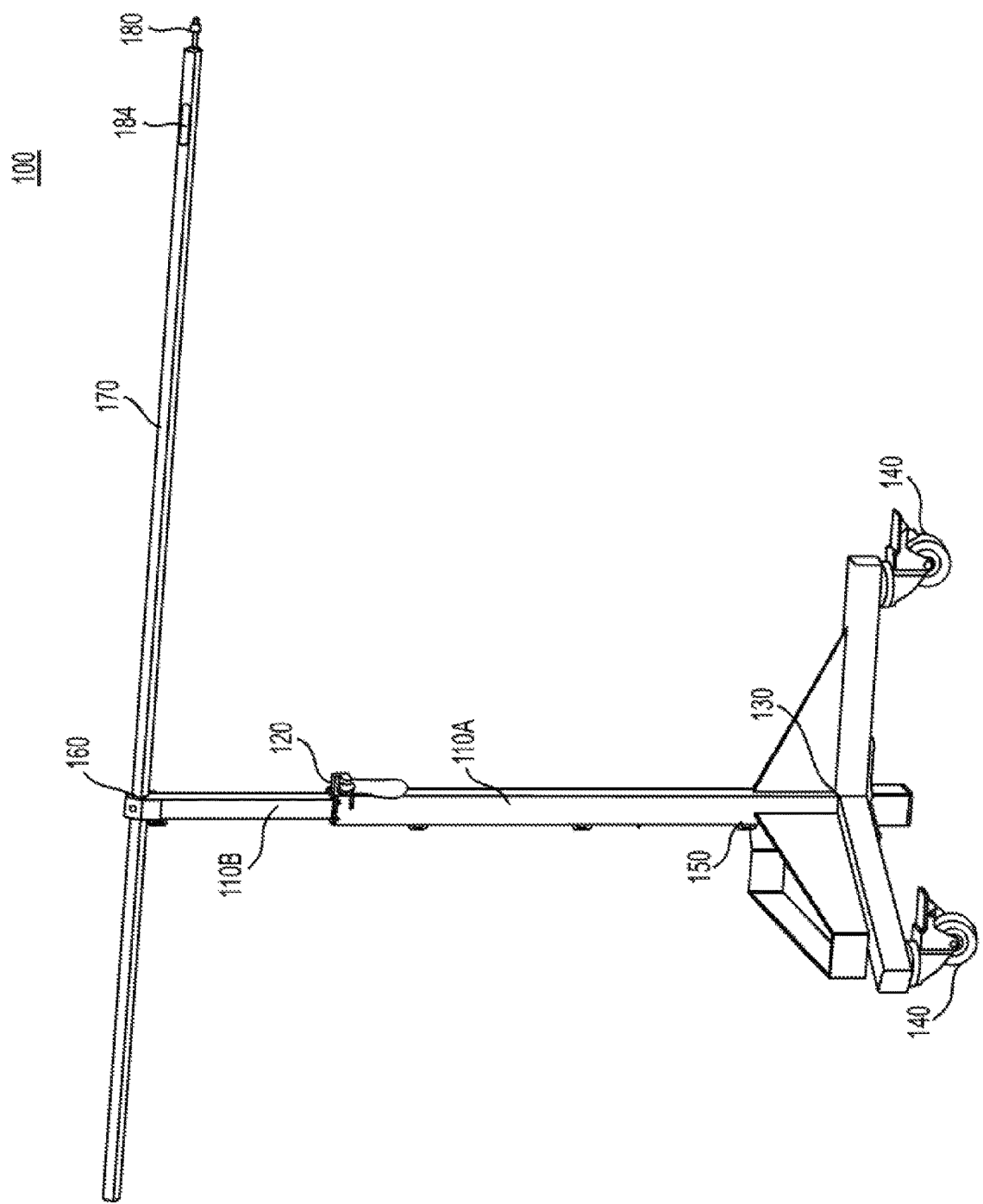
FIG. 1 shows an isometric view of an example embodiment of a vehicle image capture system according to exemplary implementations of the disclosed technology.

FIG. 1 shows an example of a vehicle image capture system 100 according to exemplary implementations of the disclosed technology. According to some embodiments, the vehicle image capture system may include a vertical support arm mounted to a base structure, which may be moveable. A horizontal support arm may be coupled to the vertical support beam. The horizontal support beam may support an image capture device at its end. The system is designed to be moved in place relative to a vehicle to be imaged. The vehicle image capture system may be configured to enable consistently repeatable and standardized images of a vehicle's interior to be captured with minimal human intervention. The vertical and horizontal support arms may be adjusted to position the image capture device in a desired location inside of the vehicle's interior in order to obtain the desired images. The system may further include a power supply coupled to the image capture device. According to some embodiments, the vehicle image capture system may be configured to facilitate capturing 360-degree images of a vehicle's interior.

Vehicle image capture system 100 may offer several features that provide imaging enhancements over traditional methods of imaging a vehicle's interior. First, vehicle image capture system 100 includes support arms adjustable in both a horizontal and vertical dimension. In some embodiments, vehicle image capture system 100 includes articulating mounts joining the support arms, allowing the support arms to be freely pivoted to adjust their angle of attachment. The articulating mounts may allow for minute adjustments of the vehicle image capture system 100 to more quickly address an undesirable offset of a vehicle interior image captured by vehicle image capture system 100. Additionally, articulating mounts may allow for capturing centered photos of a vehicle dashboard when an opened window or car door does not allow for the vehicle image capture system to be placed at an entry angle parallel to a floor surface. For example, the height of a window opening of a given vehicle may be too high to allow for a centered image to be captured of a vehicle dashboard. In this case, articulating mounts allow for the support arm to enter the vehicle at an appropriate angle to facilitate a centered image of the vehicle's interior to be captured.

Second, vehicle image capture system 100 may be semi-automated or fully automated in order to streamline the process of imaging vehicle interiors. For example, vehicle image capture system 100 may include one or more sensors configured to determine a position of the vehicle image capture system 100 with respect to a vehicle to be imaged, and one or more adjustment motors configured to adjust the vertical and horizontal dimensions of the support arms of vehicle image capture system 100, as well as being configured to adjust the position of a support base of vehicle image capture system 100 with respect the position of the vehicle to be imaged, according to feedback received by the one or more sensors. In some embodiments, the one or more sensors may include an electromagnetic and/or radar sensor coupled to the image capture device. A radar sensor may be configured to measure a distance of an object from the image capture device. A radar sensor may provide a distance measurement from the image capture device component of the system to a desired subject of the image. The radar sensor may allow for the image capture device to be place at a standardized distance from the subject to be imaged. In some embodiments, the one or more sensors may include one or more angular position sensors. The angular positional sensors may be configured to provide an operator of the vehicle image capture system angular position data associated with the angular position of each of the support arm components of vehicle image capture system 100. For example, when one or more articulating mounts are adjusted at a given angle, the one or more angular position sensors may monitor these angles to facilitate reproducibility of images captured by the vehicle image capture system 100.

In some embodiments, the one or more sensors may include positional sensors configured to measure a position of the one or more support arms of vehicle image capture system 100. For example, the positional sensors may be configured to measure a vertical dimension of a vertical support arm, and a horizontal dimension of horizontal support arm. A positional sensor may also be provided to determine the position of vehicle image capture system 100 in relation to the vehicle to be imaged. Accordingly, the one or more positional sensors may be configured to determine a location of the image capture device in relation to the vehicle to be imaged. Additionally, in some embodiments, a combination of positional sensors and angular positional sensors may be utilized to determine a location of the image capture device in relation to the vehicle to be imaged.

As shown in FIG. 1, vehicle image capture system 100 may include a hollow telescoping support beam 110 that includes an outer telescoping component 110A and an inner telescoping component 110B. Telescoping support beam 110 may be slideably adjustable to allow for vertically adjusting the position of a mounted image capture device to facilitate imaging an interior of a vehicle. The outer telescoping component 110A and inner telescoping component 110B may be fastened to each other at a desirable vertical dimension with the use of securing device 120. Securing device 120 may be a fastener or clamp that may be selectively lockable. According to some embodiments, securing device 120 may be a clamp with an adjustable cam lever. For example, in order to tighten securing device 120, an operator of vehicle image capture system 100 may first rotate the adjustable cam lever clockwise in order to pre-tighten the fastener against the hollow telescoping support beam 110. To complete the fastening process, an operator may push the adjustable cam lever from an unlocked position into a locked position after pre-tightening the clamp against the hollow telescoping support beam 110.

In some embodiments, securing device 120 may be an electromechanical gear or worm drive that may be configured to adjust a position of the inner telescoping component 110B with respect to the outer telescoping component 110A. In some embodiments, the inner telescoping component 110B may be freely rotatable with respect to the outer telescoping component 110A along their common vertical axis. In some embodiments, one or more positional sensors may be configured to measure a dimensional parameter associated with the position of the inner telescoping component 110B with respect to outer telescoping component 110A. Attached to the lower end of hollow telescoping support beam 110 is a support structure 130. According to some embodiments, support structure 130 may include a component storage tray configured to house a battery to power an image capture device. In some embodiments, the battery may additionally be configured to power one or more adjustment motors that allow for adjusting the vertical and horizontal position of the image capture device, as well as optionally allowing for the adjustment of the position of support structure 130. In some embodiments, the battery may be used to power one or more position sensors and/or computing device 400 (as described in more detail with respect to FIG. 4).

The support beams may be constructed of any sufficiently durable material. For example, the support beams may be made of aluminum, steel, or any other sufficiently durable metal alloy. In some embodiments, the support beams may be constructed of a plastic polymer such as polycarbonate or high-density polyethylene (HDPE). In some embodiments, the support beams may be made of fiberglass or a resin-based material such as Kevlar™.

In some embodiments, hollow telescoping support beam 110 may be fastened to support structure 130 by an articulating mount, allowing hollow telescoping support beam 110 to freely pivot approximately 45 degrees from the vertical plane. In some embodiments, the articulating mount may be adjustable from an angle of 0 degrees from the vertical plane to 45 degrees off-axis from the vertical plane in any given direction, allowing hollow telescoping support beam 110 to be tilted between 0 degrees and 45 degrees off-axis from the vertical plane. Articulating mounts may allow for faster dimensional adjustments to vehicle image capture system 100 to facilitate quicker and more accurate images of vehicle's interior. Additionally, articulating mounts may allow for positioning the image capture device in a desired orientation with respect to a component of a vehicle to be imaged, when a door, window, and/or other opening of the vehicle would normally interfere with positioning the image capture device at the desired location.

The vehicle image capture system 100 includes a transport subsystem attached to a bottom end of the base structure. In some embodiments, the base structure includes a plurality of base support beams. According to some embodiments, wheels 140 may be affixed to a bottom end of the base support beams of the base structure of vehicle image capture system. In some embodiments, wheels 140 may be caster wheels. In some embodiments, each of the plurality of wheels 140 may be a continuous track (e.g., a continuous band of treads driven by two or more wheels contained within the band of treads). Wheels 140 may be selectively lockable, to allow an operator to manually lock the vehicle image capture system 100 in place with respect to a vehicle to be imaged. In some embodiments, wheels 140 may be electrically coupled to the at least one electromechanical motor. In such embodiments, vehicle image capture system 100 may be configured to move itself into a desired position for capturing an image of a vehicle interior. The one or more positional sensors may be configured to determine the position of the vehicle image capture system 100 with respect to the vehicle to be imaged, allowing the vehicle image capture system 100 to move into position without intervention from a human operator. In some embodiments, an operator may manually input appropriate dimensional coordinates to the system (e.g., inputting instructions directly to computing device 400 or with a user device over a network) and the vehicle image capture system 100 may reposition itself according to the inputted dimensional coordinates. According to some embodiments, a bottom end of hollow telescoping support beam 110 may extend below the plurality of base support beams to enable vehicle image capture system 100 to be adjusted lower in a vertical dimension. In such embodiments, the bottom end of hollow telescoping support beam 110 is maintained above a ground level by the wheels 140 and/or attachment to a rail system, as described below.

In some embodiments, the vehicle image capture system 100 may be mounted to a rail system integrated into a vehicle imaging booth. The rail system may be a multi-axis motorized sliding system, allowing the vehicle image capture system 100 to be automatically adjusted in three dimensions (e.g., vertically up and down, horizontally side to side, and forwards and backwards) by sliding along the length of the rails of the rail system.

In some embodiments, the transport subsystem may mount to the rail system, which may be coupled with one or more positional sensors. In such embodiments, the rail system may be automated, allowing the vehicle image capture system to be automatically moved into a desired position with respect to a vehicle to be imaged. In some embodiments, the rail system may be manual, requiring a human operator to slide the vehicle image capture system 100 into a desired position. In the manual embodiment of the rail system, the transport subsystem of may be lockable into a desired position with respect to the rail system to ensure the vehicle image capture system 100 remains in a desired position when capturing images of a vehicle.

In some embodiments, vehicle image capture system 100 may include a plurality of wheels 140 to allow vehicle image capture system 100 to be quickly and conveniently relocated and the position of support structure 130 adjusted with respect to a vehicle to be imaged. In other embodiments, vehicle image capture system 100 may be attached to an integrated rail system in a vehicle photo booth, allowing the position of support structure 130 to be slideably adjusted with respect to a vehicle to be imaged in the vehicle photo booth. In some embodiments, wheels 140 may be lockable in order to allow the vehicle image capture system 100 to be accurately placed in a location proximate to the vehicle which is to be imaged.

As shown in FIG. 1, the top end of the inner telescoping component 110B may be joined to a second hollow support beam 170 by a support beam mount 160. In some embodiments support beam mount 160 may be an articulating mount, allowing second hollow support beam 170 to freely pivot approximately 90 degrees from the horizontal plane as described in more detail with respect to FIGS. 3A-3C. As previously described, articulating mounts may allow for faster dimensional adjustments to vehicle image capture system 100 to facilitate quicker and more accurate images of vehicle's interior. In some embodiments, support beam mount 160 may include a set screw for manually setting a position of the second hollow support beam 170 with respect to support beam mount 160. In some embodiments, support beam mount 160 may include an electromechanical gear or worm drive that allows for the automatic repositioning of the second hollow support beam 170 with respect to support beam mount 160. In some embodiments, support beam mount 160 may further include one or more sensors (e.g., angular sensors, positional sensors, and/or radar sensors) to determine dimensional parameters associated with the position of second hollow support beam 170 with respect to support beam mount 160.

According to some embodiments, second hollow support beam 170 and/or hollow telescoping support beam 110 may be of rectangular construction. In such embodiments, second hollow support beam 170 would not be capable of spinning around its horizontal axis and the components of telescoping support beam 110 would not be able to spin around their shared vertical axis. Rectangular construction of the support beams may be advantageous in preventing components of vehicle image capture system 100 from moving once selectively adjusted into a desired position for capturing one or more images of a vehicle's interior.

Located at the bottom end of outer telescoping component 110A is access slot 150. Access slot 150 may be configured to house electrical connectors running from a battery component mounted on the support structure 130 through the hollow telescoping support beam 110. A similar access slot may be included proximate to support beam mount 160 allowing the electrical connectors to be fed into second hollow support beam 170 (as described in more detail with respect to FIG. 3B). At the end of hollow support beam 170 may be an image capture device mount 180 (described in more detail with respect to FIG. 3A). According to some embodiments, the battery component may be a deep cycle battery configured to power one or more components of vehicle image capture system 100 (e.g., the image capture device, the one or more electromechanical motors and/or worm drives, the one or more sensors of image capture system 100, and/or computing device 400). In some embodiments, the battery component may be a battery charging bank having a plurality of charging ports. In some embodiments, the charging ports may be standard USB ports capable of charging a USB-compatible electronic device.

Figure 2:
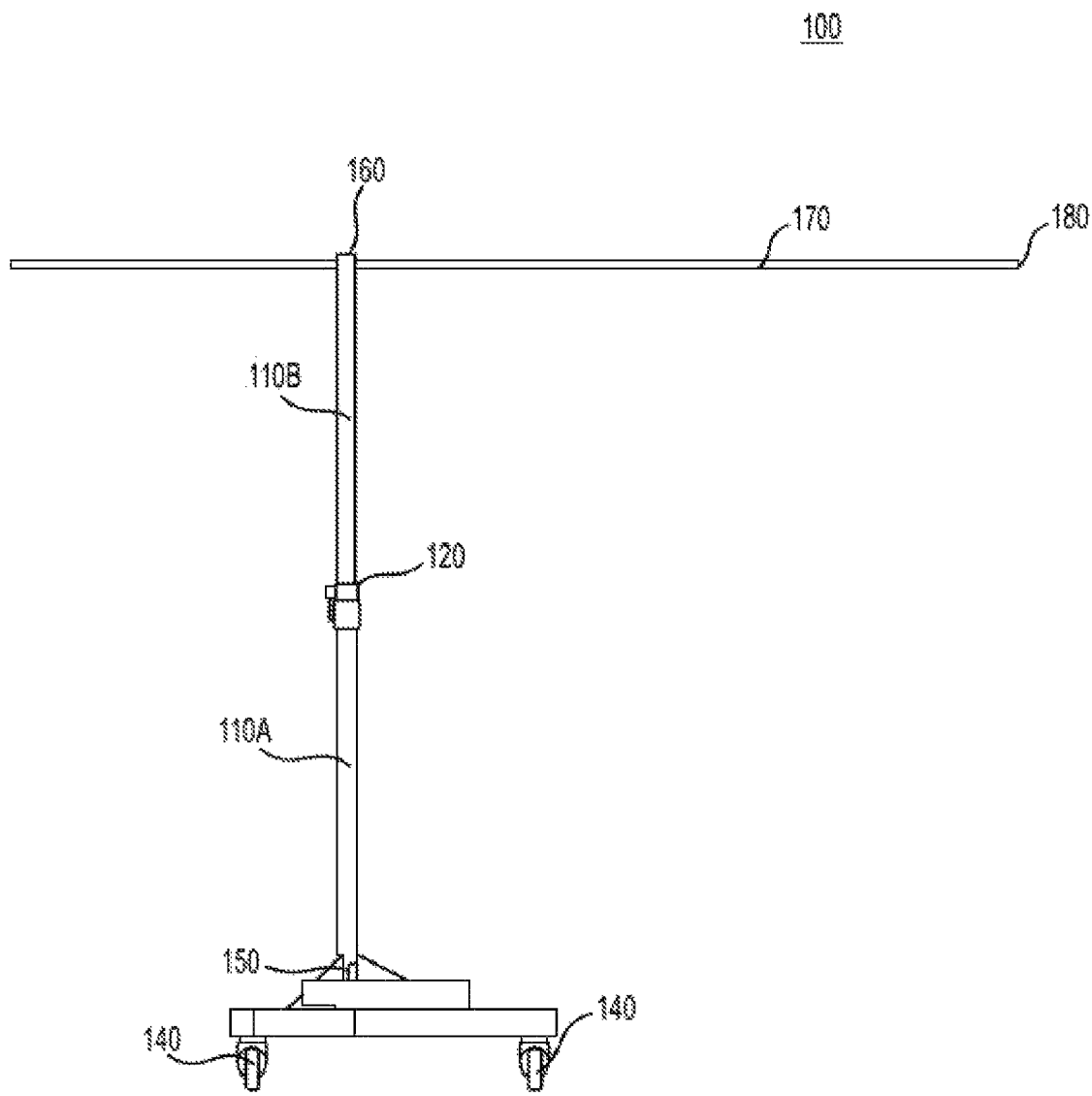
FIG. 2 shows a side profile view of an example embodiment of a vehicle image capture system according to exemplary implementations of the disclosed technology.

FIG. 2 shows a side perspective view of vehicle image capture system 100. As discussed previously with respect to FIG. 1, vehicle image capture system 100 may include a securing device 120, a support beam mount 160, and an image capture device mount 180 (as described in more detail with respect to FIGS. 3A-3C).

FIGS. 3A-3C depict example embodiments of an image capture device mount, support arm mount, and telescoping arm securing device, according to exemplary implementations of the disclosed technology. As shown in FIG. 3A, vehicle image capture device mount 180 may be located at an end of the second hollow support beam 170. Vehicle image capture device mount 180 may include a threaded end 182 configured to allow an image capture device to be securely mounted to the threaded end 182. According to some embodiments, threaded end 182 may be a modular component that is detachable from the end of second hollow support beam 170. An attachment end of the threaded end 182 may be configured to reside within a hollow opening at the end of the second hollow support beam 170. The threaded end 182 may be quickly attached and detached from second hollow support beam 170 with the use of one or more set screws 186 that may be positioned through openings found in the end of second hollow support beam 170 and the threaded end 182 when threaded end 182 is positioned inside the hollow portion of the second hollow support beam 170. Advantages of a detachable threaded end 182 include the ability to quickly swap components if the threaded end 182 becomes damaged during operation of the vehicle image capture system 100. Without a detachable threaded end 182, the entire second hollow support beam 170 may need to be replaced if the threaded end 182 malfunctions.

Additionally, vehicle image capture device mount 180 may include an access slot 184. Access slot 184 may be configured to provide an opening through which electrical connectors (not shown) running through second hollow support beam 170 and telescoping support beam 110 to connect to the image capture device mounted to threaded end 182. Electrical connectors may be used to provide power and/or send commands to the image capture device from a battery component mounted in or on support structure 130 and/or computing device 400 (described in more detail with respect to FIG. 4). According to some embodiments, the electrical connectors may be configured to run along an outside surface of telescoping support beam 110 rather than being housed on an outside surface of inner telescoping component 110B.

As shown in FIG. 3B, support beam mount 160 may be configured to secure second hollow support beam 170 in a fixed location with respect to the support beam mount 160. In some embodiments, support beam mount 160 may include set screw 162 that may be tightened to fix the location of hollow support beam 170 once hollow support beam 170 is moved to the desired position. In some embodiments, set screw 162 may be replaced by a lockable electromechanical drive and/or worm gear that allows for an automated adjustment of the position of hollow support beam 170. In some embodiments, the worm gear may be paired with one or more positional sensors to determine dimensional characteristics associated with the position of hollow support beam 170 with respect to hollow support beam mount 160. As shown in FIG. 3B, inner telescoping component 110B may adjoin the second hollow support beam 170 at support beam mount 160. In some embodiments, support beam mount may be an articulating mount, allowing second hollow support beam 170 to freely pivot approximately 90 degrees from the horizontal plane. In some embodiments, the articulating mount may be adjustable from an angle of 0 degrees from the horizontal plane to 90 degrees off-axis from the horizontal plane in any given direction, allowing second hollow support beam 170 to be positioned in range between parallel to the horizontal plane to 90 degrees in any given direction from the horizontal plane. Additionally, according to some embodiments, the second hollow support beam 170 may freely rotate about its horizontal axis. Allowing for axial rotation enables the vehicle image capture system 100 to image any aspect of a vehicle interior by allowing an image capture device to rotate freely to capture different aspects of a vehicle interior. Alternatively, in some embodiments the second hollow support beam 170 may not be rotatable along its axis, but image capture device mount 180 may be freely rotatable about the second hollow support beam, providing the same functionality as described above.

Support beam mount may include an access slot 164. Access slot 164 may be configured to provide an opening through which electrical connectors running through the inside of telescoping support beam 110 to connect to the inside of second hollow support beam 170 and ultimately to the image capture device mounted to threaded end 182.

As shown in FIG. 3C, outer telescoping component 110A and inner telescoping component 110B may be coupled by securing device 122. In some embodiments, securing device 122 may be an adjustable cam lever. For example, in order to tighten securing device 120, an operator of vehicle image capture system 100 may first rotate the adjustable cam lever clockwise in order to pre-tighten the fastener against the hollow telescoping support beam 110. To complete the fastening process, an operator may push the adjustable cam lever from an unlocked position into a locked position after pre-tightening the clamp against the hollow telescoping support beam 110. In some embodiments, securing device 122 may be a clamp that relies on frictional force to hold the inner telescoping component 110B in a fixed location with respect to outer telescoping component 110A of hollow telescoping support beam 110. In some embodiments, the securing device may be an electromechanical gear and/or worm drive configured to move the inner telescoping component 110B with respect to outer telescoping component 110A. The worm gear may be powered by the battery component and be driven to move along a groove found on the outer surface of inner telescoping component 110B that changes the position of inner telescoping component 110B with respect to outer telescoping component 110A. One or more position sensors may also be coupled with securing device 122 in order to provide vehicle image capture system 100 positional feedback.

Figure 5:
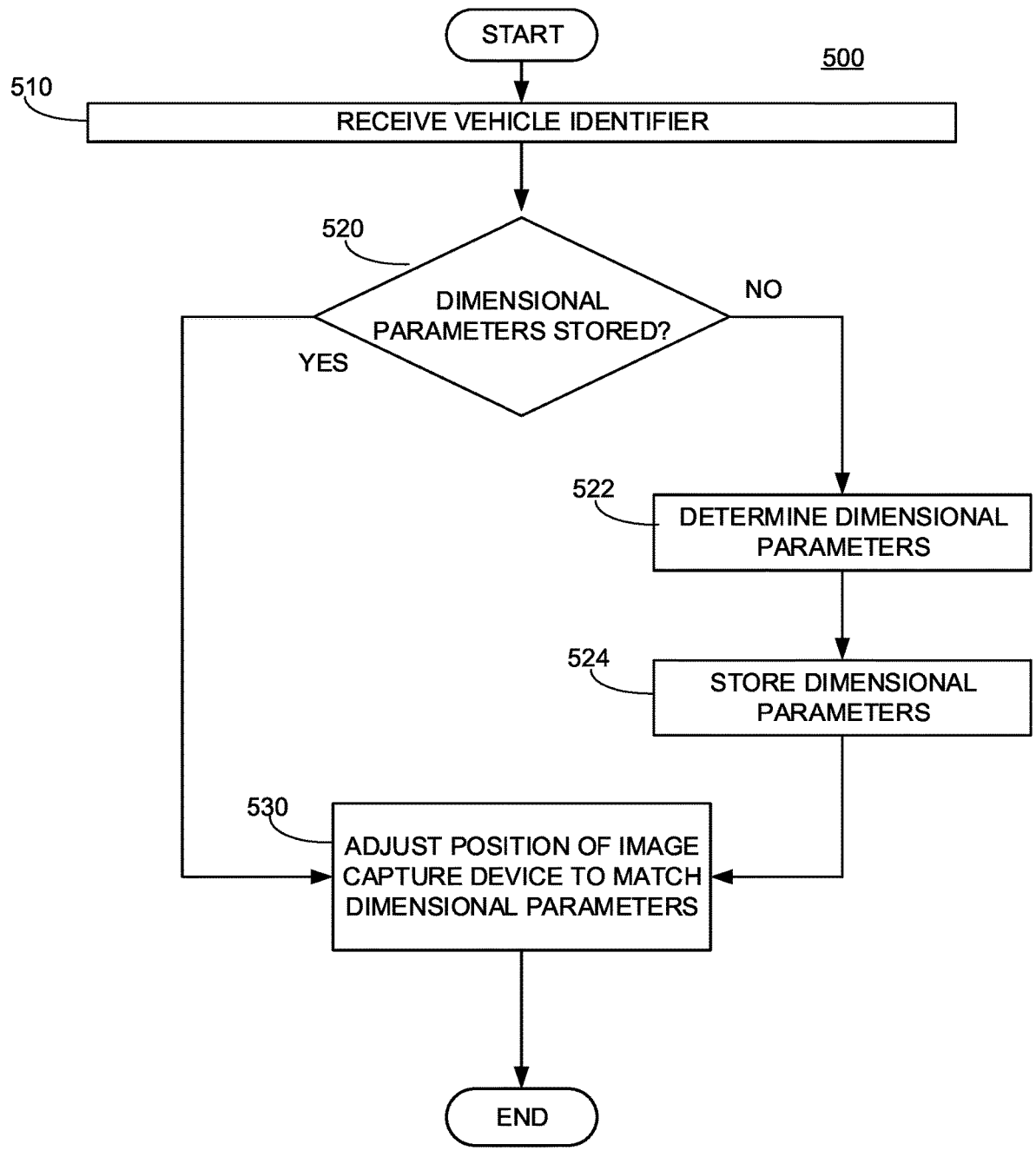
FIG. 5 is a flowchart for an exemplary method of operation of a vehicle image capture system according to exemplary implementations of the disclosed technology.

As described in more detail with respect to FIG. 5, one or more sensors on the vehicle image capture system 100 may be configured to detect dimensional parameters associated with the position of various components of vehicle image capture system 100 to determine the position of system 100 relative to a vehicle to be imaged. The one or more worm gears or electromechanical gears may be powered by one or more adjustment motors. The one or more adjustment motors can be any suitable electrical motor, including, for example, a 12 Volt DC 100-150 rpm motor. The one or more adjustment motors may power the driving gear or worm gear to provide rotational force to one or more components of the vehicle image capture system 100 in order to provide the ability to automatically modify the position of the image capture device relative to a vehicle to be imaged.

Additionally, in some embodiments, vehicle image capture system 100 may include a computing device 400 that may be powered by the battery component. In such embodiments, the computing device 400 may be configured to enable Internet of Things (IoT) technology to be incorporated into the vehicle image capture system 100 to provide remote control and monitoring, functionality for vehicle image capture system 100. Computing device 400 is discussed in further detail with respect to FIG. 4 and the various functionalities enabled by computing device 400 are discussed in further detail with respect to FIGS. 5-6. In some embodiments, vehicle image capture system 100 may be fitted with one or more sensors. For example, vehicle image capture system may include a plurality of positional sensors coupled to one or more electromechanical gears and/or worm gears that may be configured to allow components of the vehicle image capture system 100 to be accurately positioned with respect to vehicle to be imaged. For example, securing device 120 may be coupled to a positional sensor that may be configured to measure (i) an offset angle from the vertical plane and (ii) a vertical dimension representative of how far extended the inner telescoping component 110B is with respect to outer telescoping component 110A. Additionally, according to some embodiments, support beam mount 160 may be configured with a positional sensor configured to measure (i) an offset angle from the horizontal plane and (ii) a horizontal dimension representative of how far extended the second hollow support beam is with respect to support beam mount 160. According to some embodiments, when vehicle image capture system 100 is attached to an integrated rail system in a vehicle photo booth, vehicle image capture system 100 may be configured with a positional sensor configured to measure the system's position along the integrated rail system, providing information to an operator of the system of the system's position in a vehicle photo booth with respect to a vehicle to be imaged. In such embodiments, an operator may manually set the vehicle image capture system 100 to a predetermined distance from the vehicle to be imaged by positioning the support structure 130 at the appropriate position on the photo booth rail, or the vehicle image capture system may automatically position itself at the appropriate position using a electromechanical motor in combination with one or more positional sensors, one or more angular sensors, and/or one or more radar sensors. According to some embodiments, when support structure 130 is not attached to a rail system but instead includes a plurality of wheels 140, an operator of the system may manually place the support structure 130 at the appropriate position (e.g., at a predetermined distance) from a vehicle to be imaged. According to some embodiments, when support structure includes a plurality of wheels 140, the wheels may be electrically coupled to the one or more electromechanical motors and be configured to automatically move to drive the wheels to position the vehicle image capture system 100 to desired position. According to some embodiments, appropriate positional information (e.g., including the predetermined distance to set support structure 130 relative to the vehicle to be imaged, the positional dimensions to be set for support beam mount 160 and securing device 120, etc.) may be stored on computing device 400 for each make and model vehicle to be imaged by vehicle image capture system 100. Accordingly, once a particular make and model is identified by the system, the system may determine whether dimensional parameters have been previously stored for the identified vehicle, and automatically position vehicle image capture system 100 according to the previously stored dimensional parameters.

In some embodiments, computing device 400 is provided to enable IoT functionality of vehicle image capture system 100. In some embodiments, vehicle image capture system 100 may be both electronically positioned (e.g., via electromechanical drive gears and/or worm gears) and electronically monitored (e.g., via computing device 400 paired with one or more positional sensors). In some embodiments, vehicle image capture system 100 may be manually positioned and electronically monitored. Finally, in some embodiments, a fully manual vehicle image capture system 100 is provided. Advantages of the fully electronic configuration of vehicle image capture system 100 may include increased ease of use for the end-user and improved accuracy of adjustments. For example, accuracy of adjustments may be improved due to the real-time feedback provided by the one or more positional sensors. Being a fully manual system may significantly reduce the cost of manufacturing the vehicle image capture system 100 while still retaining most of the ease of use of the fully electronic embodiment. Further, being a hybrid system (e.g., electronically monitored but manually positioned) may advantageously decrease costs compared to the fully electronic embodiment, with the added benefit of providing most of the adjustment accuracy of the fully electronic configuration.

Figure 4:
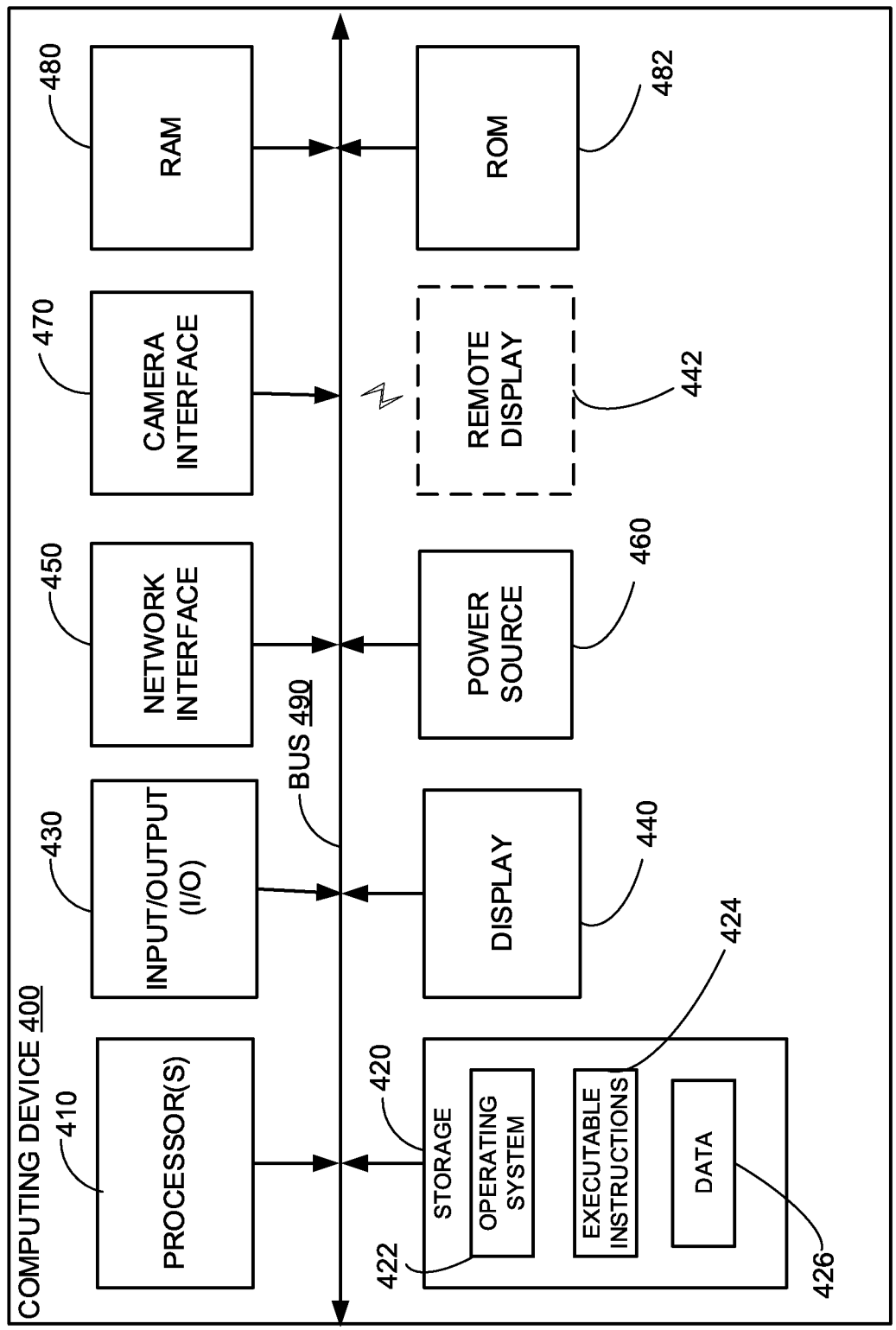
FIG. 4 depicts a computing system according to an exemplary implementation of the disclosed technology.

FIG. 4 provides an architectural diagram of the computing device 400, and implementations of the disclosed technology may include the computing device 400 with more or fewer components than those shown. It will be understood that the example diagram of computing device 400 is provided for example purposes only and does not limit the scope of the various implementations of the present disclosed systems, methods, and computer-readable mediums. As shown, the computing device 400 may include a central processing unit (CPU) 410 for processing computer instructions and a display interface 440 that supports a graphical user interface and provides functions for rendering video, graphics, images, and texts on the display. In an example implementation, display interface 440 may be configured for providing data, images, and other information for an external/remote display 442 that is not necessarily physically connected to the computing device 400 (e.g., by providing a remote graphical user interface to a user computing device via an application user interface over a network). In certain example implementations, display interface 440 wirelessly communicates, for example, via a Wi-Fi channel, Bluetooth connection, or other available network connection interface 450 to the external/remote display (e.g., remote display 442).

The network may be of any suitable type, including individual connections via the internet such as cellular or WiFi networks. In some embodiments, the network may connect the security system to external components using direct connections such as radio-frequency identification (RFID), near-field communication (NFC), Bluetooth®, low energy Bluetooth® (BLE), WiFi™, ZigBee®, ambient backscatter communications (ABC) protocols, USB, or LAN.

In an example implementation, network connection interface 450 may be configured as a wired or wireless communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, another like communication interface, or any combination thereof.

Computing device 400 may include an input/output interface 430 that provides a communication interface to one or more components of vehicle image capture system 100and one or more user computing devices (e.g., in wireless communication with computing device 400 over a network). Computing device 400 may be configured to use one or more input components via one or more of input/output interfaces (for example, input/output interface 430, remote display interface 442, network connection interface 450, a camera interface 470, etc.) to allow computing device architecture 400 to present information to a user (e.g., captured images from vehicle image capture system 100) and capture information from the environment of the vehicle image capture system 100 through information recorded by e.g., the one or more positional sensors integrated into vehicle image capture device 100. In some embodiments, user input 430 may be provided by an external component (e.g. a user computing device) via electronic communication over a wireless network.

In example implementations, network connection interface 450 may support a wireless communication interface to a network. As mentioned above, input/output interface 430 may be in communication with network connection interface 450, for example, to receive instructions from the user computing device via a network, thereby enabling communication with devices that are not directly connected or attached to the system. In certain implementations, camera interface 470 may be provided that acts as a communication interface and provides functions for capturing digital images from the image capture device integrated into vehicle image capture device 100 and providing this image, series of images, or video to the user computing device to allow a user of the user computing device to assess the quality of the captured image. According to example implementations, a random-access memory (RAM) 480 may be provided, where computer instructions and data may be stored in a volatile memory device for processing by the processor(s) 410.

According to example implementations, computing device architecture 400 may include a read-only memory (ROM) 482 where invariant low-level system code or data for basic system functions such as basic input and output (I/O), startup, or reception of keystrokes from a keyboard may be stored in a non-volatile memory device. According to example implementations, computing device 400 may include a storage medium 420 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files including an operating system 422, application programs (including, for example, a web browser application, a widget or gadget engine, an application programming interface (API) to communicate with, for example, a user computing device, and or other applications, as necessary), executable instructions 424 (including stored programs that enable various operations of the method, and data files 426, which may include image files captured by the vehicle image capture system 100. According to example implementations, computing device architecture 400 may include a power source 460 that may provide an appropriate alternating current (AC) or direct current (DC) to power components.

According to an example implementation, processor 410 may have appropriate structure to be a computer processor. In one arrangement, processor 410 may include more than one processing unit. RAM 480 may interface with a computer bus 490 to provide quick RAM storage to the processor 410 during the execution of software programs such as the operating system, application programs, and device drivers.

More specifically, processor 410 may load computer-executable process steps from storage medium 420 or other media into a field of RAM 480 to execute software programs. Data may be stored in RAM 480, where computer processor 410 may access data during execution. In one example configuration, and as will be understood by one of skill in the art, computing device 400 may include sufficient RAM and flash memory for carrying out processes relating to the disclosed technology.

Storage medium 420 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow a computing device to access computer-executable process steps, application programs and the like, stored on removable and non-removable memory media, to off-load data from the device or to upload data onto the device. A computer program product for enabling the image capture routines (as described in more detail with respect to FIGS. 5-6) of the vehicle image capture system 100 may be tangibly embodied in storage medium 420, which may include a non-transitory, machine-readable storage medium.

According to example implementations, the term "computing device," as used herein, may be a processor, or conceptualized as a processor (for example, processor 410 of FIG. 4). In such example implementations, the computing device (processor) may be coupled, connected, and/or in communication with one or more peripheral devices, such as vehicle image capture system 100 and/or a user computing device.

In example implementations of the disclosed technology, a computing device includes any number of hardware and/or software applications that are executed to facilitate any of the operations. In example implementations, one or more input/output interfaces 430 may facilitate communication between the computing device 400 and one or more devices, such as components of the vehicle image capture system 100 (e.g., the image capture device and/or the one or more electromechanical motors) and/or associated sensors (e.g., input from the one or more positional sensors). The one or more user input/output interfaces 430 may be utilized to receive or collect data and/or user instructions from a wide variety of input devices (e.g., user computing device and/or load sensor and/or vibration sensor). Received data may be processed by one or more computer processors 410 as desired in various implementations of the disclosed technology and/or stored in one or more memory devices, such as storage medium 420.

One or more network interfaces 450 may facilitate connection of the computing device inputs and outputs to one or more suitable networks and/or connections. For example, the connections that facilitate communication with any number of sensors associated with the system. The one or more network interfaces 450 may further facilitate connection to one or more suitable networks; for example, a local area network, a wide area network, the Internet, a Wi-Fi enabled network, a satellite-based network, any wired network, any wireless network, etc., for communication with external devices and/or systems. In some embodiments, vehicle image capture system 100 may be configured to receive and act on instructions from computing device 400.

FIG. 5 is a flowchart for an exemplary method of operation of the vehicle image capture system 100. First, an operator of vehicle image capture system 100 may position the system at a predetermined distance from the vehicle to be imaged (e.g., either manually placing support structure 130 at the appropriate position by rolling the system to the appropriate location using wheels 140 or in some embodiments, issuing a command via computing device 400 to position the system at the appropriate position along the rail system (e.g., as determined by the rail system positional sensor previously described).

According to some embodiments, when using vehicle image capture system 100 to capture 360-degree images, the system may be configured to capture images for a plurality of vehicle configurations. For example, the desired image configurations may include images with all seats (front driver, front passenger, and rear seats) in an upright position, all seats folded down, front seats upright with rear seats folded down, middle seats (e.g., in the case of a three row vehicle) down with front and rear seats up, and a split seat configuration where with driver's side seats up and passenger side seats down, or vice versa (driver's seat down, and passenger side seats up).

According to some embodiments, vehicle image capture system 100 may be configured to capture 360-degree images of various portions of a vehicle interior. There may be numerous configurations of how the vehicle image capture system 100 may be positioned with respect to the vehicle to be imaged, depending on which aspect of the vehicle interior is to be imaged. For example, when the target interior photo is from a perspective of a driver's seat of the vehicle, the vehicle image capture system 100 may be configured to be placed proximate a driver's side front window. According to some embodiments, 360-degree images may be created for the plurality of seat configurations described above.

When the target interior photo is from a perspective of a center console, the vehicle image capture system 100 may be positioned proximate a driver's side front window. Similarly, in the center console imaging configuration, 360-degree images may be created for the plurality of seat configurations as described above.

When the vehicle image capture system 100 is used for imaging a 360-degree view from a passenger seat, the vehicle image capture system 100 may be positioned proximate a passenger's side front window and/or a driver's side front window. Similarly, in the passenger seat imaging configuration, 360-degree images may be created for the plurality of seat configurations as described above.

When the vehicle image capture system 100 is used for imaging a 360-degree view of a middle row position (e.g., driver's side middle seat, center middle seat, and/or passenger middle seat) in three row vehicle, vehicle image capture system 100 may be positioned proximate a driver's side rear window or a passenger's side rear window. Similarly, in the middle row imaging configuration, 360-degree images may be created for the plurality of seat configurations as described above.

When the vehicle image capture system 100 is used for imaging a 360-degree view of a rear row position (e.g., driver's side rear seat, middle rear seat, and/or passenger's side rear seat), vehicle image capture system 100 may be positioned proximate a driver's side rear window or a passenger's side rear window. According to some embodiments, the vehicle image capture system 100 may be positioned proximate a trunk or tailgate to capture images from a rear row position (e.g., for vehicles that have a trunk portion open to a passenger compartment, such as SUVs, wagons, and crossovers). Similarly, in the rear row imaging configuration, 360-degree images may be created for the plurality of seat configurations as described above.

When the vehicle image capture system 100 is used for imaging a 360-degree view of a trunk or tailgate position, vehicle image capture system 100 may be positioned proximate a trunk or tailgate of the vehicle to be imaged. As described above, in the trunk/tailgate imaging configuration, 360-degree images may be created for the plurality of seat configurations as described above.

In step 510, processor 410 may receive a first signal including a vehicle identifier. For example, an operator of vehicle image capture system may utilize I/O 430 to manually input a vehicle identifier associated with a vehicle to be imaged by the system. In some embodiments, an operator may photograph a vehicle identification number (VIN) plate associated with the vehicle to be imaged, which computing device 400 may receive via one of network interface 450 or camera interface 470. Processor 410 may analyze the received image to determine the VIN associated with the vehicle, which may be used as the vehicle identifier. In another embodiment, an operator may scan a barcode or RFID enabled device associated with a vehicle, which may serve as the vehicle identifier.

In step 520, computing device 400 may determine whether dimensional parameters have been previously stored for the vehicle identified by the vehicle identifier. For example, processor 410 may query storage 420 or an external database (not shown) via network interface 450 to determine whether the appropriate dimensional parameters have been previously stored for the identified vehicle. In response to determining that dimensional parameters for the identified vehicle have been previously stored, computing device 400 may send a signal to one or more of the electromechanical gears to adjust the position of one or more of securing device 120, support beam mount 160, and/or support structure 130 (e.g., when employing the embodiment attached to a rail system in a photobooth). The positioning of vehicle image capture system 100 may be monitored by the one or more positional sensors, which provide continuous monitoring and feedback to the electromechanical gears and/or worm drives responsible for repositioning vehicle image capture system 100 according to the stored dimensional parameters. For example, the system may identify vehicle A and adjust the position of the various components of system 100 to advantageously position an image capture device to capture a high fidelity, close-up 360-degree image of various components of Vehicle A's interior (e.g., a dashboard) in step 530. Due to the advantageous design of vehicle image capture system 100, images captured by the system will are not marred by undesirable artifacts associated with having an image capture device mount and/or tripod being placed inside of the interior of Vehicle A to facilitate the image capture.

When the system (e.g. computing device 400) determines that no dimensional parameters have been previously stored for the identified vehicle, the system may determine dimensional parameters in step 522. For example, an operator of the system may manually measure the appropriate dimensional parameters for the vehicle in question (e.g., by measuring the width, height, and depth of various components of the vehicle to be imaged) and enter the determined dimensions into computing device 400 (e.g. via I/O 430) and/or a user computing device in communication with the computing device 400. In some embodiments, system 100 may automatically determine appropriate dimensional parameters by capturing an image and determining a dimensional parameter offset based on the captured image, as described in more detail with respect to FIG. 6). In step 524, the system may store the determined dimensional parameters before moving to step 530, as described above.

Figure 6:
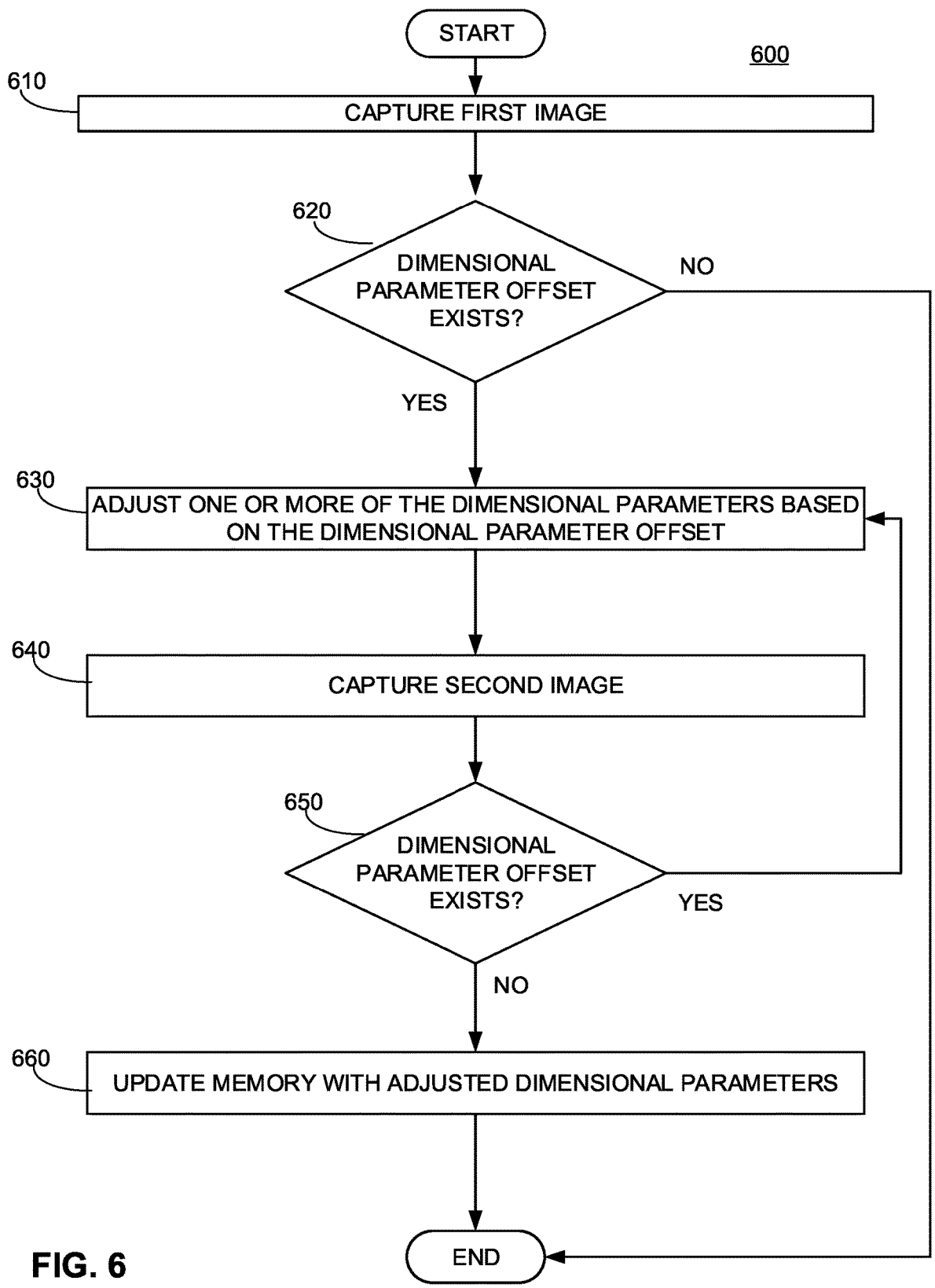
FIG. 6 is a flowchart for an exemplary method for determining a dimensional parameter offset and updating the stored dimensional parameters according to exemplary implementations of the disclosed technology.

FIG. 6 is a flowchart for an exemplary method for determining a dimensional parameter offset and updating the stored dimensional parameters. Method 600 may be utilized to correct and adjust previously stored dimensional parameters, or in some embodiments, generate dimensional parameters for vehicle not having dimensional parameters previously stored by the system. In step 610, the system may capture a first image of a vehicle to be imaged. For example, according to some embodiments the first image may be an image of a vehicle dashboard. In decision block 620, the system may determine whether a dimensional parameter offset exists for the first captured image. For example, computing device 400 may analyze the first image to determine whether the dashboard of the vehicle being imaged is appropriately centered in the frame of the image. When no dimensional parameter offset exists, the method may end. When computing device 400 determines that a dimensional parameter offset exists, the method may move to step 630. When the system determines that a dimensional parameter offset exists, the system may estimate the value of the offset, for example by calculating a pixel offset in the first captured image, the pixel offset being representative of the offset from a centered frame of the vehicle dashboard being imaged. According to some embodiments, the image analysis of step 620 may be performed locally by computing device 400, while in other embodiments, computing device 400 may transmit the captured images (e.g., first image) to an external processor for determining whether a dimensional parameter offset exists.

In step 630, the system may adjust one or more of the dimensional parameters based on the dimensional parameter offset. For example, after determining the pixel offset in the first captured image, computing device 400 may send a signal to the plurality of drive gears to adjust the position of one or more of securing device 120, support beam mount 160, and/or support structure 130. The position of each of these components may be monitored by the one or more positional sensors previously described.

In step 640, vehicle image capture system 100 may capture a second image. This step may be substantially similar to step 610, previously described. In decision block 650, vehicle image capture system may determine whether a dimensional parameter offset exists based on an analysis of the captured image, which may be a similar method as described with respect to decision block 620. When the system determines that a dimensional parameter still exists, method 600 may return to step 630, to adjust one or more dimensional parameters based on the calculated dimensional parameter offset before capturing an additional image for verifying whether the offset has been corrected. When the system determines that a dimensional parameter offset no longer exists (e.g., that the desired vehicle image is centered in the frame of the image), the method may move to step 660. In step 660, the system may update the memory with the adjusted dimensional parameters. For example, the adjusted dimensional parameters may be stored on an external database (not shown) by computing device 400, or alternatively may be stored on storage 420. After step 660, method 600 may end.

Figure 7:
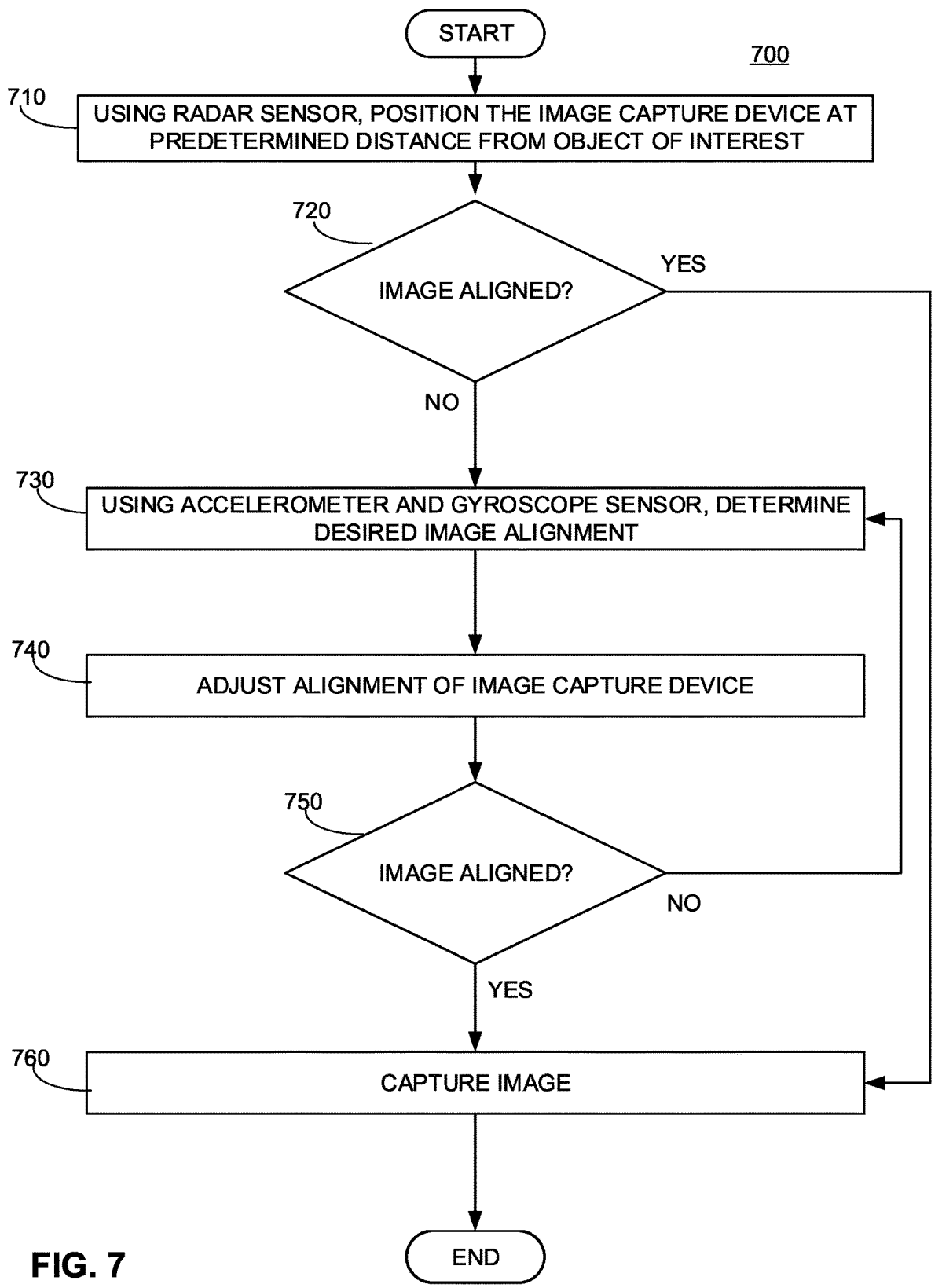
FIG. 7 is a flowchart for an exemplary method for determining image alignment according to exemplary implementations of the disclosed technology.

FIG. 7 is a flowchart for an exemplary method for determining an image alignment while using vehicle image capture system 100. Method 700 may be used to adjust an image capture device used with vehicle image capture system 100 to a desired distance from an object of interest to be imaged, and further to determine that the object of interest is aligned (e.g., not tiled) with respect to the frame of the captured image. In step 710, an operator may manually position the vehicle image capture system 100 into place, or the image capture system 100 may be positioned automatically as described in more detail with respect to FIG. 5 (e.g., by receiving a vehicle identifier, querying the computing device 400 for stored dimensional parameters, and adjusting the position of the image capture device to match the dimensional parameters). The image capture device may be equipped with a radar sensor that is configured to measure a distance between the image capture device and the object to be imaged. The radar sensor may be used to verify whether the image capture device has been placed at a predetermined distance as defined by the stored dimensional parameters.

In decision block 720, the system may determine whether the object of interest is aligned in the frame of an image to be captured by the image capture device. For example, if the image capture device is improperly tilted, the system may detect the tilt using one or more of an accelerometer and gyroscope associated with the image capture device. When the image is determined to be aligned in decision block 720, computing device 400 may send instructions to the image capture device to capture the desired image in step 760. When the system detects that the image is not aligned, the method may move to step 730.

In step 730, the system may utilize the accelerometer and gyroscope sensors associated with the image capture device to determine a desired alignment, and computing device 400 may transmit instructions to the vehicle image capture system 100 to change positions of one or more components of the system (e.g., telescoping support arm 110, second hollow support arm 170, and/or angular orientation of the articulating mounts) in order to set the desired alignment in step 740.

In decision block 750, the system may determine whether the image is properly aligned. When the system determines the image is still not properly aligned, the method may return to step 730 to determine the desired image alignment. When the system determines that the image is in alignment, the method may move to step 760, in which the vehicle image capture system 100 captures the desired image. After step 760, the method may end.

Example implementations of the disclosed technology may provide vehicle image capture systems and methods. According to one aspect, the system may include an image capture device configured to image an interior of a vehicle and a support structure. The support structure may include a base structure, which may include a transport subsystem mounted to the base structure and a battery component. The support structure may include a telescoping hollow support beam, which may include an outer sleeve and an inner sleeve. A bottom end of the outer sleeve of the telescoping hollow support beam may be connected to a top surface of the base structure with a first articulating mount. The inner sleeve may be configured to slideably adjust with respect to the outer sleeve, and a top end of the inner sleeve may include an articulating head configured to receive a second hollow support beam. The system may include a securing device configured to secure the inner sleeve in an adjustable position with respect to the outer sleeve. The system may include a second hollow support beam secured to the articulating head of the inner sleeve of the telescoping hollow support beam. The second hollow support beam may be configured to slideably adjust with respect to the articulating head. A first end of the second hollow support beam may further include a second articulating mount configured to receive the image capture device. The second hollow support beam may be configured to be in a generally perpendicular orientation to the telescoping hollow support beam. The system may include one or more electrical cables positioned at least partially within the base structure, the telescoping hollow support beam, and the second hollow support beam to electrically connect at least the image capture device and the battery component.

In some embodiments, the transport subsystem may further include a plurality of caster wheels. In some embodiments, the base structure may further include a plurality of base beams. Each of the plurality of base beams may have a bottom surface connected to a mounting point of the transport subsystem. In some embodiments, the base structure may further include a storage component attached to a top surface of at least one of the plurality of base beams. The storage component may include a flat bottom surface having raised edges configured to secure the battery component of the system.

In some embodiments, the bottom end of the outer sleeve of the telescoping hollow support beam may have a first access slot proximate to the storage component. The first access slot may be configured to receive the one or more electrical cables from the battery component extending a length of the telescoping hollow support beam on an inside surface of the telescoping hollow support beam.

In some embodiments, the transport subsystem may be placed proximate a front driver's side window of the vehicle when the image capture device is imaging a vehicle dashboard.

In some embodiments, the system may further include at least one adjustment motor coupled to the telescoping hollow support beam and the second hollow support beam. The at least one adjustment motor may be configured to adjust at least one of a vertical dimension of the telescoping hollow support beam or a horizontal dimension of the second hollow support beam to position the image capture device to image the vehicle dashboard.

In some embodiments, the system may include one or more sensors configured to determine a horizontal position and a vertical position associated with the vehicle image capture system in relation to the vehicle being imaged.

In another aspect, a method of imaging a vehicle dashboard of a vehicle is disclosed. The method may include, receiving, by one or more processors in communication with an image capture device, a vehicle identifier corresponding to a vehicle to be imaged by the image capture device. The method may include determining whether a memory in communication with the one or more processors includes dimensional parameters for the vehicle corresponding to the vehicle identifier. In response to determining that the memory includes the dimensional parameters, the method may include adjusting a position of the image capture device to match the dimensional parameters for the vehicle.

In some embodiments, the method may include, responsive to determining that the memory does not include the dimensional parameters, receiving a first input including the dimensional parameters for the vehicle being imaged, storing the dimensional parameters in the memory, and adjusting the position of the image capture device to match the dimensional parameters for the vehicle.

In some embodiments, a support base structure configured to support the image capture device is placed proximate a front driver's side window of the vehicle when the image capture device is imaging a vehicle dashboard. In some embodiments, the vehicle identifier includes one of a vehicle identifier number (VIN) or a make and model of a vehicle.

In some embodiments, the method may further include capturing a first image via the image capture device, determining, by at least one of the one or more processors, a dimensional parameter offset based on the captured first image. The method may include adjusting one or more of the dimensional parameters based on the dimensional parameter offset, and updating the memory with the adjusted dimensional parameters for the vehicle.

In another embodiment, a moveable image capture assembly comprises a base structure having a transport subsystem, a vertical support assembly coupled to the base structure at a first end, a horizontal support arm coupled to the a second end of the vertical support assembly, and an image capture device coupled to a first end of the horizontal support arm. The vertical support assembly includes an inner sleeve portion adjustably received in an outer sleeve portion, and a securing device for adjustably securing the inner sleeve portion at a first vertical arrangement and a first rotational orientation relative the outer sleeve portion. The horizontal support arm is configured to slidably adjust along a horizontal axis while coupled to the second end of the vertical support assembly. The image capture device may be electrically connected to a power source housed on the base structure.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle image capture system, the system comprising:
   an image capture device configured to image an interior of a vehicle;
   a support structure comprising:
     a base structure comprising:
       a transport subsystem mounted to the base structure; and
       a battery component;
     a telescoping hollow support beam in a generally vertical orientation comprising an outer sleeve and an inner sleeve, a bottom end of the outer sleeve of the telescoping hollow support beam connected to a top surface of the base structure with a first articulating mount, wherein the inner sleeve is configured to slideably adjust with respect to the outer sleeve, and wherein a top end of the inner sleeve further comprises an articulating head configured to receive a second hollow support beam, the articulating head allowing for variable adjustment of an angle between the telescoping hollow support beam and the second hollow support beam;
     a securing device configured to secure the inner sleeve in an adjustable position with respect to the outer sleeve; and
     the second hollow support beam in a generally horizontal orientation secured to the articulating head of the inner sleeve of the telescoping hollow support beam, the second hollow support beam configured to slideably adjust with respect to the articulating head, wherein a first end of the second hollow support beam further comprises a second articulating mount configured to receive the image capture device, and wherein the first end of the second hollow support beam is configured to position the image capture device at the interior of the vehicle.

2. The vehicle image capture system of claim 1, wherein the transport subsystem further comprises a plurality of caster wheels.

3. The vehicle image capture system of claim 1, wherein the base structure further comprises a plurality of base beams, each one of the plurality of base beams having a bottom surface connected to a mounting point of the transport subsystem.

4. The vehicle image capture system of claim 3, wherein the base structure further comprises a storage component attached to a top surface of at least one of the plurality of base beams, the storage component comprising a flat bottom surface and having raised edges configured to secure the battery component.

5. The vehicle image capture system of claim 4, wherein the bottom end of the outer sleeve of the telescoping hollow support beam has a first access slot proximate to the storage component, the first access slot configured to receive one or more electrical cables.

6. The vehicle image capture system of claim 1, wherein the transport subsystem is placed proximate a front driver's side window of the vehicle when the image capture device is imaging a vehicle dashboard.

7. The vehicle image capture system of claim 6, further comprising at least one adjustment motor coupled to the telescoping hollow support beam and the second hollow support beam and configured to adjust at least one of a vertical dimension of the telescoping hollow support beam or a horizontal dimension of the second hollow support beam to position the image capture device to image the vehicle dashboard.

8. The vehicle image capture system of claim 7, further comprising one or more sensors configured to determine a horizontal position and a vertical position associated with the vehicle image capture system in relation to the vehicle being imaged.

9. A vehicle image capture system, the system comprising:
   an image capture device configured to image an interior of a vehicle;
   a support structure comprising:
     a base structure comprising:
       a transport subsystem mounted to the base structure; and
       a battery component;
     a telescoping hollow support beam in a generally vertical orientation comprising an outer sleeve and an inner sleeve, a bottom end of the outer sleeve of the telescoping hollow support beam connected to a top surface of the base structure, wherein the inner sleeve is configured to slideably adjust with respect to the outer sleeve, and wherein a top end of the inner sleeve is configured to receive a second hollow support beam;
     a securing device configured to secure the inner sleeve in an adjustable position with respect to the outer sleeve; and
     the second hollow support beam in a generally horizontal orientation configured to slideably adjust with respect to the inner sleeve of the telescoping hollow support beam, wherein a first end of the second hollow support beam is configured to receive the image capture device and to position the image capture device at the interior of the vehicle; and
   one or more sensors configured to determine a horizontal position and a vertical position associated with the vehicle image capture system in relation to the vehicle being imaged.

10. The vehicle image capture system of claim 9, wherein the transport subsystem is placed proximate a front driver's side window of the vehicle when the image capture device is imaging a vehicle dashboard.

11. The vehicle image capture system of claim 10, further comprising at least one adjustment motor coupled to the telescoping hollow support beam and the second hollow support beam and configured to adjust at least one of a vertical dimension of the telescoping hollow support beam or a horizontal dimension of the second hollow support beam to position the image capture device to image the vehicle dashboard.

12. The vehicle image capture system of claim 9, wherein the base structure further comprises a plurality of base beams, each one of the plurality of base beams having a bottom surface connected to a mounting point of the transport subsystem.

13. The vehicle image capture system of claim 12, wherein the base structure further comprises a storage component attached to a top surface of at least one of the plurality of base beams, the storage component comprising a flat bottom surface and having raised edges configured to secure the battery component.

14. The vehicle image capture system of claim 13, wherein the bottom end of the of the outer sleeve of the telescoping hollow support beam has a first access slot proximate to the storage component, the first access slot configured to receive one or more electrical cables.

15. The vehicle image capture system of claim 9, wherein the transport subsystem further comprises a plurality of caster wheels.

16. The vehicle image capture system of claim 9, further comprising:
   one or more processors;
   memory in communication with the one or more processors and storing instructions that, when executed by the one or more processors, are configured to cause the vehicle image capture system to:
      receive, by the one or more processors, from the image capture device, a vehicle identifier corresponding to the vehicle to be imaged by the image capture device;
      determine whether the memory includes dimensional parameters for the vehicle corresponding to the vehicle identifier; and
      responsive to determining that the memory includes the dimensional parameters, adjust a position of the image capture device to match the dimensional parameters for the vehicle.

17. The vehicle image capture system of claim 16, wherein the instructions are further configured to cause the vehicle image capture system to:
   responsive to determining that the memory does not include the dimensional parameters:
      receive a first input comprising the dimensional parameters for the vehicle being imaged;
      store the dimensional parameters in the memory; and
      adjust the position of the image capture device to match the dimensional parameters for the vehicle.

18. The vehicle image capture system of claim 16, wherein the vehicle identifier further comprises one of a vehicle identification number (VIN), or a make and model of a vehicle.

19. The vehicle image capture system of claim 16, wherein the instructions are further configured to cause the vehicle image capture system to:
   capture a first image via the image capture device;
   determine, by at least one of the one or more processors, a dimensional parameter offset based on the captured first image;
   adjust one or more of the dimensional parameters based on the dimensional parameter offset; and
   update the memory with the adjusted dimensional parameters for the vehicle.

20. The vehicle image capture system of claim 9, wherein the second hollow support beam is configured to extend through a door or window of the vehicle.

* * * * *